United States Patent [19]

Mizuno et al.

[11] 4,187,067
[45] Feb. 5, 1980

[54] DIE FOR PRODUCING PLASTIC RESIN PELLETS

[75] Inventors: Haruyuki Mizuno; Atsushi Idemoto; Kunihiro Horie, all of Hiroshima, Japan

[73] Assignee: The Japan Steel Works, Ltd., Tokyo, Japan

[21] Appl. No.: 940,675

[22] Filed: Sep. 8, 1978

[30] Foreign Application Priority Data

Sep. 13, 1977 [JP] Japan .................... 52-109481

[51] Int. Cl.² .......................... B29C 17/14
[52] U.S. Cl. .................... 425/313; 425/464; 264/142
[58] Field of Search ............ 425/313, 464, 197; 264/142

[56] References Cited

U.S. PATENT DOCUMENTS 3,452,934 7/1969 McNeal .................... 425/197

Primary Examiner—Jay H. Woo
Attorney, Agent, or Firm—Sughrue, Rothwell, Mion, Zinn and Macpeak

[57] ABSTRACT

A die formed of a series of concentric rings is disclosed. An outer body has a series of communication ports for the introduction of a heating medium. An inner body having the same axial thickness as the outer body is placed inside the outer and in the annular space defined between the inner and outer bodies a series of annular rings are placed. The annular rings each have a series of nozzles disposed in a circumferential ring and are formed with grooves on their outer walls to define jackets between the rings. The jackets are in communication with the communication ports to supply a heating medium to the jacket.

10 Claims, 6 Drawing Figures

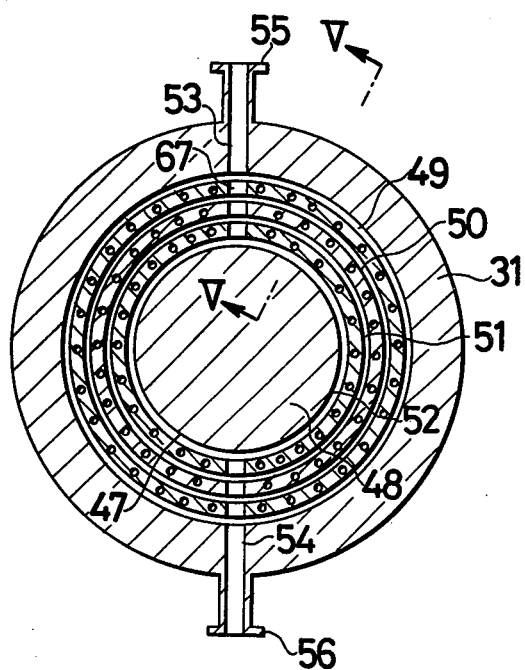
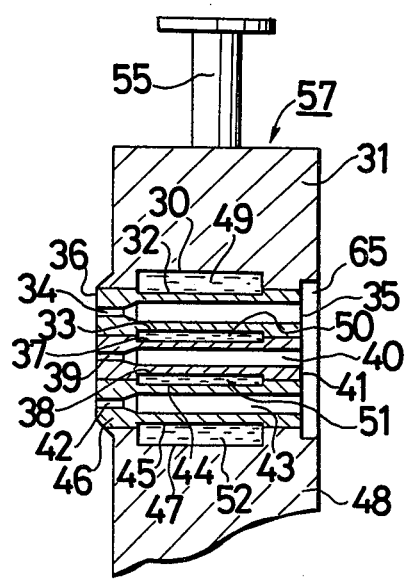
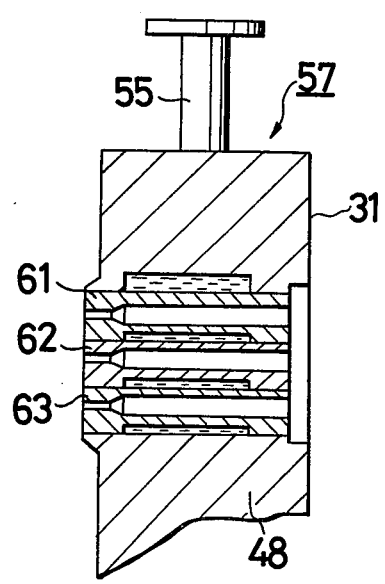

DIE FOR PRODUCING PLASTIC RESIN PELLETS

BACKGROUND OF THE INVENTION

The present invention relates to a die for producing plastic resin pellets.

The capacity of recently developed extruding apparatus has tended to increase. One type of device uses a die in an underwater cutting system wherein molten resin is extruded into a water medium to form pellets.

This type of device is generally shown in U.S. Pat. No. 3,029,466. That patent shows in FIG. 1 a die having an inlet for resin to be extruded through nozzles 23, and an annular inlet 16 for a heating medium is provided with an outlet 17. Hence, the heating medium circulates only on the inside of the nozzles. Additional heating in the form of helical heating coils 18 are provided on the outer surface of wall 10. Also, in the vicinity of the nozzles steam is supplied via inlet 28 to conduits 24. It is apparent that this die is very complicated, using three discrete types of heating. However, uniformity will still not occur due to different heating rates and the large number of components.

Another type is a hot cutting device wherein molten resin is extruded into a water shower to form pellets. In both cases, the dies employed have been enlarged, with the concomitant increase in the number of nozzles formed in the dies. Since the surface of the die is water-cooled, the temperature of the molten resin through the nozzles is decreased and the viscosity thereof is accordingly increased. As a result, it is difficult to attain smooth flow of the molten resin through the nozzles and the amount of extruded resin is reduced.

Also the enlargement of the dies creates discontinuities in the temperature of the nozzles. This non-uniform temperature results in the creation of pellets of varying sizes. Also the nozzles tend to clog with cooled resin. The forming of the pellets is therefore impossible. In case of a die having a small capacity and a small number of nozzles, it is possible to uniformly heat the nozzle by arranging them on a concentric circle and concentrically providing water jackets inside and outside of the nozzle circle. However, in case of a die having a large capacity and number of nozzles, it is generally not possible to arrange the nozzles on a single concentric circle. Therefore, in this situation, generally, the nozzles are arranged on a plurality of concentric circles. In such arrangement, it is important to uniformly heat and maintain the nozzles at a suitable temperature for extruding.

In view of these requirements, FIGS. 1 and 2 show one example of a prior art extrusion die wherein two grooves 2 and 2' having suitable widths and depths extend from different coaxial positions of one side of a disc-shaped body 1 and two associated annular members 3 and 3' are sealingly inserted into the grooves 2 and 2' to thereby form jackets 4 and 5, respectively. A pair of holes 6 and 7 communicate with the jackets 4 and 5 and are formed in the body 1 in a substantially symmetrical manner, and sleeve-shaped adapters 8 and 9 having a flanged portion are secured to the inlets of the holes 6 and 7. Additionally, a plurality of nozzles 11 each having a small diameter portion 10 in its end are formed in an annular portion between the jackets 4 and 5 in a plurality of parallel lines.

In utilizing the die 12, a molten resin is introduced into the nozzles 11, extruded through the small diameter portions 10 to the outside and cut by a cutter (not shown) into pellets each having a suitable size. A fluidized medium for heating is introduced through the adapter 8 and the hole 6 (FIG. 1) to the jackets 4 and 5 and discharged from the hole 7 and adapter 9. The technique heats the peripheral portions of the nozzles 11.

In such a structure, the nozzles adjacent to the high temperature jackets 4 and 5, such as nozzles 11a and 11b, are heated to a desired temperature, however the nozzle elements spaced the jackets 4 and 5, such as nozzle 11c, has a lower temperature than desired due to heat dissipation and the surrounding temperature. This temperature gradient is generated even between the jacket facing surface and the opposite surface of a single nozzle. In the situation where the device is employed in which molten resin is extruded into the water to abruptly cool the molten metal, the temperature difference due to the position of the nozzles is very large.

FIG. 3 shows a second example of a prior art device. In order to eliminate the above noted defect of temperature gradients, additional jackets 24 and 25 are added between a plurality of the nozzle lines in addition to the jackets 22 and 23. The jackets 24 and 25 are provided along outer and inner circumferences of nozzles 21 in the same manner as in the previous example. Annular members 26 and 27 are inserted into the grooves 24 and 25 in the same manner as the previous example. The other constructional elements are the same as the prior art shown in FIGS. 1 and 2. In the die 28 constructed in accordance with this example, molten resin in the nozzles is uniformly heated because of the addition of the jackets 24 and 25. The local temperature drop as in the first example can therefore be avoided.

However, the second example has another defect that impedes efficiency. Since the jacket is formed with a number of grooves, the minimum distance between the adjacent grooves has a finite limit in view of manufacturing and machining limitations. As a result, the distance between the adjacent grooves tends to be considerable and additionally the distance between the adjacent nozzle elements increases.

Accordingly, the die 28 produced in accordance with this prior art example has an unsatisfactory large size. With the enlargement of the die 28, the associated pellet producing device, that is, the cutter for cutting the extruded resin and the motor for driving the cutter must have a correspondingly large size or capacity. With the enlargement of the cutter diameter, deformations in the cutter blade tend to result so that poor cutting is carried out. Hence although the problem of heating in a uniform manner is overcome, the type of device exhibits other undesirable qualities.

Also, the openings of the jackets 22 to 25 must be clogged by annular members 29, 29', 26 and 27, respectively. This results in a job requiring skill that is time-consuming to clog the jackets with the members 29, 29', 26 and 27. At the same time, the body 20 may be deformed by inserting the annular members into the openings so that the mechanical accuracy in the die 28 will become deteriorated.

SUMMARY OF THE INVENTION

Briefly, an object of the invention is to provide a die that will overcome the above defects of the prior art.

It is another object of this invention to provide a die rugged in construction that will produce pellets of uniform size and shape. These and other objects of this invention are accomplished by means of a die having a sleeve-shaped outer body and an annular inner body of the same thickness as the outer body. A plurality of annular rings are formed in the space between the inner body and the outer body, each having a nozzle element in the axial direction and at least one groove in the peripheral portion for the formation of jackets. A pair of communication ports are formed in the outer body in communication with each other through the jackets formed by the rings.

The invention will be described with reference to the following description of the preferred embodiments and the drawings.

BRIEF DESCRIPTION OF THE DRAWINGS

FIG. 4 is a cut away end view of an extrusion die in accordance with this invention;

FIG. 5 is a partial sectional view of the die shown in FIG. 4 along line V—V; and FIG. 6 is a partial sectional view of an extrusion die in accordance with a modification of the FIGS. 4-5 embodiment.

DESCRIPTION OF THE PREFERRED EMBODIMENT

Figure 1:
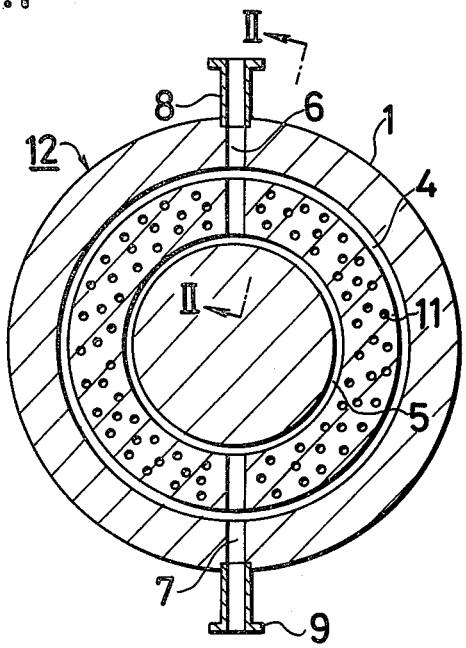
FIG. 1 is a cut away end view of a first prior art type of extrusion die.
Figure 2:
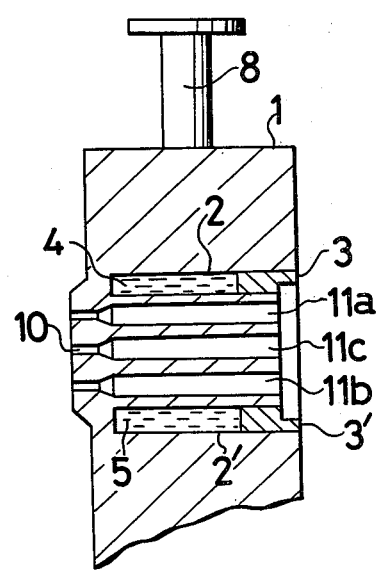
FIG. 2 is a partial sectional view of FIG. 1 along line II—II.
Figure 3:
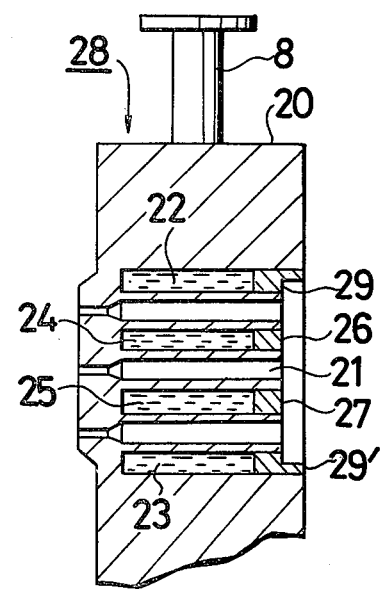
FIG. 3 is a partial view of a second type of extrusion die.

Referring to FIGS. 4 and 5, an annular ring 36 is formed having grooves 33 and 32 in its inner and outer periphery and a plurality of through-nozzles 35 each having a small diameter portion 34 in one end in the axial direction. This ring is inserted in an outer body 31. The outer diameter of the ring 36 is approximately the same dimension as the inner diameter of the outer body 31. On a single circumferential line, the nozzles are positioned at equal intervals. The length in the axial direction of the ring 36 is substantially the same as that of the outer body 31. The annular ring 36 is therefore in the form of a sleeve of the same thickness as the outer body. The annular ring 36 is secured to the outer body 31 at the somewhat displaced position to the left as shown in FIG. 5. This causes a protrusion in the area where the nozzles are tapered and a manifold section 65.

A second annular ring 41 having the same outer diameter as the inner diameter of the above ring 36 is inserted in the ring 36. The groove-shaped ring 41 has grooves 38 and 37 in its inner and outer peripheral portions and a plurality of nozzles 40 having a small diameter portion are formed in its end portion. The nozzles 40 have a reduced section 39 and are arranged at uniform interval on a single circumferential line. The ring 41 is secured at the same axial position as the ring 36.

In the same manner, an annular ring 46 having a plurality of nozzles 43 each having a small diameter portion 42 and grooves 44 and 45 is inserted and secured. An inner body 48 is further inserted into the innermost ring 46. The inner body is provided with an annular groove 47 and is in the form of a disc, having the same axial length as that of the outer body 31. The inner body 48 is secured at the same axial position as the outer body 31. Hence jackets 49, 50, 51 and 52 are formed adjacent the nozzle lines 35, 40 and 43. As in the case of the prior art defined herein, a pair of holes 53 and 54 having suitable diameters are formed in the outer body 31. Each of the holes extends from the outer peripheral portion of the outer body 31 to the innermost groove 47 of the inner body 48 via communication ducts 67. Adapters 55 and 56 having flanges are formed at the ends of the holes 53 and 54.

In operation, molten resin is introduced from the right as viewed in FIG. 5 into a manifold section 65 and then to the nozzles 35, 40 and 43, and extruded from the small diameter portions 34, 39 and 42, and cut by the cutter (not shown) into pellets each having a suitable pellet size. During this operation, the fluidized medium for heating is supplied in the jackets 49, 50, 51 and 52 through the adapter 55 and hole 53 and the communication ducts 67 to thereby heat the molten resin flowing through the nozzles 35, 40 and 43. Consequently, the suitable uniform temperature thereof can be maintained. Thereafter, the fluidized medium is exhausted from the adapter 56 through the hole 54.

FIG. 6 shows another embodiment of the invention. Each of annular ring members 61, 62 and 63 has a groove formed in its inner peripheral portion and the outer body 31 has a groove in its inner portion. The other construction is the same as that of the preceeding embodiment. Of course, the same effect is obtained as in the embodiment of FIGS. 4 and 5. Alternatively, each of the annular ring members can have a groove in its outer peripheral portion and the inner body 48 can have a groove in its outer portion in order to achieve the same effect.

In the above embodiments, three nozzle rings are shown but the number of nozzles of the invention is not limited to the specific embodiment. Hence, a larger number may be used consistent with this invention.

In a die constructed according to the invention, since the molten resin within the nozzles is uniformly heated by the jackets adjacent to outer and inner peripheral portions of the nozzles, temperature of the resin is maintained. Local non-uniform variations are avoided. The resin flow is therefore maintained, and the prior art difficulties of having the cooled resin stiffened within the nozzles is avoided. According to the invention, pellets each having a uniform size can be obtained. Further, in the present invention, the jackets are not formed by cut-machining to form grooves in the axial direction of the body but by combining a succession of annular rings each having grooves in its outer and/or inner peripheral portions. Therefore, it is unnecessary that the distance between the adjacent nozzle lines be limited by the limits of cut machining which are unacceptably large.

According to the invention, it is possible to provide a die having a minimum distance between the adjacent nozzle lines which enables the fluidized medium to heat the molten resin. Therefore, it is not necessary to widen the distance between the adjacent nozzle lines. The size of die can be maintained as small as required. The conventional pellet producing device can therefore be used without modification. The cutter and the motor therefore can also be maintained at a minimum size.

Furthermore, according to the invention, the pellets are readily or simply produced. The die is not deformed during the operation of the die of the present invention.

It will be understood that various changes can be made in the die as set forth herein without departing from the spirit and scope of this invention.

We claim:

1. A plastic resin die for the production of pellets comprising;

an outer sleeve, said outer sleeve having a pair of ports extending through said sleeve, an inner body disposed coaxial with said outer sleeve, said outer sleeve and inner body defining an annular space therebetween, a plurality of annular rings assembled in said annular space, each of said annular rings having at least one nozzle extending in the axial direction and at least one groove formed in one wall portion to define at least one annular jacket, wherein said ports are in communication with said annular jacket.

2. The die of claim 1 wherein said inner body has the same axial thickness as said outer body.

3. The die of claim 1 further including a plurality of nozzles in said rings, said nozzles arranged on each of said rings on a single circumferential line.

4. The die of claim 3 wherein said rings are axially displaced relative to said outer sleeve and said inner body, and further comprising an annular manifold disposed between said outer sleeve and said inner body upstream of said nozzles.

5. The die of claim 1 further comprising a second groove formed in a section wall portion of each of said annular rings.

6. The die of claim 5 wherein the first groove of one annular ring is axially aligned with the second groove of another annular ring to define a series of annular jackets between said annular rings.

7. The die of claim 1, further comprising an annular groove formed on the inside wall of said outer sleeve.

8. The die of claim 7 wherein said grooves are disposed on inner surfaces of said annular rings.

9. The die of claim 1 further comprising an annular groove formed of the outside wall of said inner body to define a jacket between said inner body and the adjacent annular ring.

10. The die of claim 9 wherein said grooves are disposed on outer surfaces of said annular rings.

* * * * *